United States Patent [19]

Gomez

[11] 4,104,336
[45] Aug. 1, 1978

[54] POLYETHYLENE MODIFIERS FOR HIGH NITRILE POLYMERS

[75] Inventor: I. Luis Gomez, Longmeadow, Mass.

[73] Assignee: Monsanto Company, St. Louis, Mo.

[21] Appl. No.: 774,885

[22] Filed: Mar. 7, 1977

[51] Int. Cl.$^2$ .................. C08L 23/06; C08L 25/12; C08L 33/18; C08L 33/20

[52] U.S. Cl. .................... 260/897 A; 260/28.5 R; 260/33.6 UA; 260/897 B; 260/897 C

[58] Field of Search ............. 260/28.5 R, 33.6 UA, 260/897 B, 897 C, 897 A

[56] References Cited

U.S. PATENT DOCUMENTS

| | | | |
|---|---|---|---|
| B 507,456 | 3/1976 | Wurmb et al. ............. | 260/28.5 R |
| 2,841,569 | 7/1958 | Rugg et al. ................ | 260/897 B |
| 2,962,463 | 11/1960 | Schroeder et al. .......... | 260/28.5 R |
| 3,310,604 | 3/1967 | Steingiser et al. .......... | 260/859 |
| 3,358,052 | 12/1967 | Archer, Jr. et al. ......... | 260/859 |
| 3,647,920 | 3/1972 | DiLeone ................... | 260/28.5 R |
| 3,997,489 | 12/1976 | Coker ...................... | 260/33.6 UA |

*Primary Examiner*—Alan Holler
*Attorney, Agent, or Firm*—Michael J. Murphy

[57] ABSTRACT

High nitrile polymers modified with the addition of selected amounts of low molecular weight polyethylene have improved processing properties including increased melt flow and significantly inhibited color formation when processing at high shear and high temperatures.

10 Claims, No Drawings

POLYETHYLENE MODIFIERS FOR HIGH NITRILE POLYMERS

BACKGROUND OF THE INVENTION

The present invention relates to high nitrile polymers which are compounded with selected amounts of low molecular weight polyethylene modifiers to provide particularly improved processing properties.

In recent years, it has been found that certain high nitrile polymers are especially suitable for packaging applications because of their excellent water and oxygen barrier properties. Such polymers are described at length in U.S. Pat. Nos. 3,451,538; 3,615,710 and 3,426,102 among others. The high nitrile polymers may be molded or shaped into various articles including films, sheets and containers such as bottles, jars, cans, cups, tubs, etc. Additionally, such articles may be recycled and reground so as to reuse the polymer material.

Heretofore, the ability to process and reprocess high nitrile polymers has not been a simple task since many flow modifiers and lubricants are either incompatible or ineffective when used in such a polymer system and often cause degradation and color problems.

SUMMARY OF THE INVENTION

It has now been found that high nitrile polymers which have been compounded with a low molecular weight polyethylene modifier have improved processing properties including increased melt flow, can be readily extruded or injection molded at increased output and can be molded at lower stock temperatures. In addition, such modified polymers exhibit improved color properties and do not show any signs of degradation when processed at high shear ($\gamma \sim 20,000$ sec$^{-1}$) and high temperatures (T>500° F; 260° C). More particularly, this invention relates to a nitrile polymer composition comprising (a) from about 50 to about 90% by weight, based on total polymer weight calculated as acrylonitrile, of a nitrile polymer having the formula:

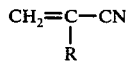

wherein R is hydrogen, an alkyl group of 1 to 4 carbon atoms or halogen; (b) one or more ethylenically unsaturated copolymerizable comonomer materials and (c) from about 0.005 to about 2% by weight, based on total polymer weight, of a low molecular weight polyethylene modifier.

DETAILED DESCRIPTION OF THE INVENTION

The high nitrile polymer composition of this invention generally contains from about 50 to about 90% by weight of an olefinically unsaturated mononitrile based on the total polymer weight and calculated as acrylonitrile and having the formula:

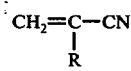

wherein R is hydrogen, an alkyl group having 1 to 4 carbon atoms or an halogen. Such compounds include acrylonitrile, methacrylonitrile, ethacrylonitrile, propioacrylonitrile, alpha chloroacrylonitrile, etc. The most preferred olefinically unsaturated nitriles are acrylonitrile and methacrylonitrile and mixtures thereof.

The nitrile composition of this invention generally will contain one or more comonomer materials copolymerizable with the olefinically unsaturated nitriles and including:

(a) the monovinylidene aromatic hydrocarbon monomers of the formula:

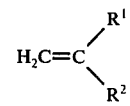

wherein R$^1$ is hydrogen, chlorine or methyl and R$^2$ is an aryl group of 6 to 10 carbon atoms and may also contain substituents such as halogen as well as alkyl groups attached to the aromatic nucleus, e.g. styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

(b) lower alpha olefins of from 2 to 8 carbon atoms, e.g. ethylene, propylene, isobutylene, butene-1, pentene-1 and their halogen and aliphatic substituted derivatives, e.g. vinyl chloride, vinylidene chloride, etc.

(c) acrylic acid and methacrylic acid and the corresponding acrylate and methacrylate alkyl esters wherein the alkyl group contains from 1 to 4 carbon atoms, e.g. methyl acrylate, ethyl acrylate, propyl acrylate, methyl methacrylate, etc.

(d) vinyl esters of the formula:

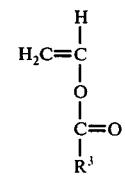

wherein R$^3$ is hydrogen, an alkyl group of from 1 to 10 carbon atoms, an aryl group of 6 to 10 carbon atoms, e.g. vinyl formate, vinyl acetate, vinyl propionate, vinyl benzoate, etc. and (e) vinyl ether monomers of the formula:

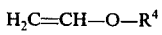

wherein R$^4$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbon or oxygen - containing, i.e. an aliphatic radical with ether linkages and may also contain other substituents such as halogen, carbonyl, etc. Examples of these monomeric vinyl ethers include vinyl methyl ether, vinyl ethyl ether, vinyl-n-butyl ether, vinyl 2-chloroethyl ether, vinyl phenyl ether, vinyl cyclohexyl ether, 4-butyl cyclohexyl ether, and vinyl p-chlorophenylene glycol ether, etc.

Additional comonomers useful in the practice of this invention are those comonomers which contain a mono- or di-nitrile function. Examples of these include methylene glutaronitrile, 2,4-dicyanobutene-1, vinylidene cyanide, crotonitrile, fumaronitrile, maleonitrile. The preferred comonomers are the monovinylidene aromatic hydrocarbons, lower alpha olefins and acrylic and methacrylic acid and the corresponding acrylate and methacrylate esters with the monovinylidene aromatic hydrocarbons being more particularly preferred. More specifically preferred is styrene and alpha methylstyrene. Another preferred composition is that wherein a terpolymer of nitrile, styrene and vinyl ether is used such as disclosed in U.S. Pat. No. 3,863,014, issued Jan. 28, 1975.

The amount of comonomer, as defined above, which is present in the nitrile composition can vary from about 10 to about 50% by weight based on the total weight of the nitrile polymer composition. Preferably, the nitrile composition will contain from about 55 to about 85% by weight of nitrile monomer components and from about 15 to about 45% by weight of comonomer and more preferably from about 60 to about 80% by weight of nitrile monomer and from about 20 to about 40% by weight of comonomer all based on the total polymer weight.

The modifier used in this invention is low molecular weight polyethylene having a molecular weight of from about 2000 to 12,000 and preferably from about 2000 to 10,000. The amount of such modifier will depend to some extent on the particular end application and may vary from about 0.005 to about 2% by weight, preferably from about 0.005 up to about 1% and more preferably from about 0.005 up to about 0.025%. The lower concentrations are particularly desirable in sensitive applications where slight haze formation can be a problem.

The invention also contemplates the use of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc., which are used to strengthen or toughen articles prepared from the high nitrile polymers. This rubber component may be incorporated into the nitrile containing polymer by any of the methods which are well known to those skilled in the art, e.g., direct polymerization of monomers, polyblends, grafting the acrylonitrile monomer mixture onto the rubber backbone, etc. Especially preferred are polyblends derived by mixing a graft copolymer of acrylonitrile and comonomer on the rubber backbone with another copolymer of acrylonitrile and the same comonomer. Generally, such rubber component may comprise from 0 to about 25% and preferably up to about 10% by weight of the nitrile polymer composition.

The manner in which the polyethylene modifier is added to the nitrile polymer composition is not critical and it may be added to the polymer in bead or powder form and may also be added in combination with other additives such as formaldehyde compounds as disclosed in U.S. Pat. Nos. 3,870,802 and glycerol or sorbitan ester modifiers as disclosed in 3,931,074.

The following examples are set forth in illustration of the present invention and are not to be construed as limitations thereof.

EXAMPLE I

A nitrile composition comprising 90% by weight of methacrylonitrile and 10% styrene was compounded with 440 ppm of polyethylene having a molecular weight of about 9000. The compounded composition was then extruded in a C. W. Brabender ¾ inch extruder at a melt stock temperature of 250° C, an extrusion torque of 4500 MG (metergram) and an extrusion rate of 20.0 gm/min.

For comparison purposes, a similar nitrile composition without the polyethylene modifier was extruded in the same equipment. The melt stock temperature was 252° C, the extrusion torque 6800 MG (metergram) and the extrusion rate 10.0 gm/min.

EXAMPLE II

A polymer composition comprising 70% by weight acrylonitrile and 30% styrene was compounded with 100 ppm of polyethylene having a molecular weight of about 9000. The composition was formed into a number of 65 gram injection molded tubular preforms in a standard injection molding machine having a multi-cavity mold. The formed preforms were measured for yellowness +b value using a Hunter Lab Color Difference Meter and the average value was 13.8.

For comparison purposes, preforms were formed from a similar polymer composition but without the polyethylene modifier. The average yellowness value (+b) was found to be 15.8. This shows a decrease in yellowness of 2 units or about 13% when the modified polymer composition was used.

The preforms made in the various cavities were also observed under U.V. light to determine the extent of yellow streak distribution (discoloration band). For the preforms formed in the outermost cavities, an average yellow streak of 0.50 inches width resulted when using the modified composition whereas a width of 0.60 inches resulted when using the non-modified composition. This represents a decrease of almost 17% when the polyethylene modifier was used. Preforms in the innermost cavities were also measured for yellow streak distribution and found to have an average of 0.07 inches width when using the modified composition vs. 0.10 for a non-modified composition, a decrease of 30%.

EXAMPLE III

A sample of reworked polymer having a composition of 70% by weight acrylonitrile and 30% styrene was mixed with 1% by weight of low molecular weight polyethylene (M.W. of 6000–9000) and evaluated using a 1.25 inch extruder torque rheometer. Results show a reduction in extrusion torque of about 90% for the modified composition when compared to a similar composition without the polyethylene modifier.

What is claimed is:

1. A nitrile polymer composition comprising (a) from about 50 to about 90% by weight, based on total polymer weight calculated as acrylonitrile, of a polymerized nitrile monomer having the formula:

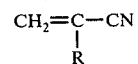

wherein R is hydrogen, an alkyl group of 1 to 4 carbon atoms or halogen, (b) one or more ethylenically unsaturated polymerized comonomer materials, and (c) from about 0.005 to about 2% by weight based on total polymer weight, of a low molecular weight polyethylene modifier.

2. The composition of claim 1 wherein said polyethylene modifier has a molecular weight of about 2000 to about 12,000.

3. The composition of claim 2 wherein said comonomer material is selected from the group consisting of:

(i) monovinylidene aromatic hydrocarbon monomer of the formula:

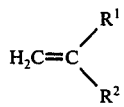

wherein $R^1$ is hydrogen, chlorine or methyl and $R^2$ is an aryl group of 6 to 10 carbon atoms;

(ii) lower alpha olefins of from 2 to 8 carbon atoms;

(iii) acrylic acid and methacrylic acid and the corresponding acrylate and methacrylate alkyl esters wherein the alkyl group contains 1 to 4 carbon atoms;

(iv) vinyl esters of the formula:

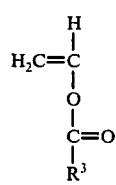

wherein $R^3$ is hydrogen, an alkyl group of 1 to 10 carbon atoms or any aryl group of 6 to 10 carbon atoms; and (v) vinyl ether monomers of the formula:

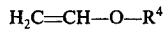

wherein $R^4$ is an alkyl group of from 1 to 8 carbon atoms, an aryl group of from 6 to 10 carbon atoms or a monovalent aliphatic radical of from 2 to 10 carbon atoms.

4. The composition of claim 3 wherein said nitrile monomer is acrylonitrile or methacrylonitrile.

5. The composition of claim 4 wherein said nitrile monomer is acrylonitrile and said comonomer is styrene present in amounts of from about 10 to about 50% by weight.

6. The composition of claim 5 wherein said polyethylene modifier is present in amounts of from about 0.005 to about 1% by weight.

7. The composition of claim 6 wherein said polyethylene modifier is present in amounts of from about 0.005 to about 0.025% by weight.

8. The composition of claim 6 wherein said nitrile monomer is present in amounts of from about 55 to 85% by weight and said comonomer is present in amounts of from about 15 to about 45% by weight.

9. The composition of claim 8 wherein said polyethylene modifier is present in amounts of from about 0.005 to about 0.25% by weight.

10. The composition of claim 9 wherein said polyethylene modifier has a molecular weight of from about 2000 to about 10,000.

* * * * *